United States Patent
Hiernaux et al.

(10) Patent No.: US 10,519,793 B2
(45) Date of Patent: Dec. 31, 2019

(54) BRUSH SEAL FOR A TURBINE ENGINE ROTOR

(71) Applicant: SAFRAN AERO BOOSTERS SA, Herstal (BE)

(72) Inventors: Stéphane Hiernaux, Oupeye (BE); Nicolas Habotte, Pousset (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 89 days.

(21) Appl. No.: 15/940,163

(22) Filed: Mar. 29, 2018

(65) Prior Publication Data
US 2018/0283192 A1    Oct. 4, 2018

(30) Foreign Application Priority Data
Mar. 31, 2017    (BE) .................... 2017/5222

(51) Int. Cl.
  *F16J 15/32*    (2016.01)
  *F01D 11/00*    (2006.01)
  *F16J 15/3288*    (2016.01)

(52) U.S. Cl.
CPC ......... *F01D 11/001* (2013.01); *F16J 15/3288* (2013.01); *F05D 2220/32* (2013.01); *F05D 2230/60* (2013.01); *F05D 2240/56* (2013.01); *F05D 2250/232* (2013.01); *F05D 2250/314* (2013.01); *Y02T 50/672* (2013.01)

(58) Field of Classification Search
None
See application file for complete search history.

(56) References Cited

U.S. PATENT DOCUMENTS

| | | | | |
|---|---|---|---|---|
| 5,316,318 A | * | 5/1994 | Veau | F16J 15/3288 277/355 |
| 5,328,328 A | * | 7/1994 | Charbonnel | F01D 11/001 415/160 |
| 5,425,543 A | * | 6/1995 | Buckshaw | F16J 15/3288 165/9 |
| 5,927,721 A | * | 7/1999 | Schulze | F16J 15/3288 277/355 |
| 5,944,320 A | * | 8/1999 | Werner | F16J 15/3288 277/355 |

(Continued)

FOREIGN PATENT DOCUMENTS

| | | |
|---|---|---|
| EP | 2843196 A1 | 3/2015 |
| WO | 2007028353 A1 | 3/2007 |

OTHER PUBLICATIONS

Search Report dated Nov. 17, 2017 for BE 201705222.

*Primary Examiner* — Michael Lebentritt
(74) *Attorney, Agent, or Firm* — James E. Walton (57) ABSTRACT

An aircraft turbojet low-pressure compressor includes a sealing device for a turbine engine. The device includes an internal stator shroud connected to an external casing via an annular row of stator vanes and a rotor with two brush seals arranged inside the shroud and respectively upstream and downstream. The internal shroud includes a frustoconial internal surface, which is associated with each brush seal. Each frustoconical surface lies flush with and is inclined with respect to the bristles of the brush seal, so as to seal with the said brush. A method for assembling a sealing device is also proposed.

20 Claims, 4 Drawing Sheets

(56) References Cited

U.S. PATENT DOCUMENTS

| | | | | |
|---|---|---|---|---|
| 6,010,132 A | * | 1/2000 | Bagepalli | F01D 9/023 277/355 |
| 6,170,831 B1 | * | 1/2001 | Bouchard | F01D 11/005 277/355 |
| 7,918,643 B2 | * | 4/2011 | Weaver | F01D 11/001 277/347 |
| 2003/0151207 A1 | * | 8/2003 | Shore | F16J 15/3288 277/355 |
| 2004/0100033 A1 | * | 5/2004 | Tong | F16J 15/061 277/411 |
| 2005/0111967 A1 | * | 5/2005 | Couture | F01D 5/225 415/173.4 |
| 2005/0194747 A1 | * | 9/2005 | Morgan | F01D 9/023 277/358 |
| 2008/0284107 A1 | * | 11/2008 | Flaherty | C04B 35/10 277/355 |
| 2009/0050410 A1 | * | 2/2009 | Berberich | F01D 11/003 184/6.11 |
| 2009/0072486 A1 | * | 3/2009 | Datta | F16J 15/3288 277/355 |
| 2011/0223013 A1 | * | 9/2011 | Wlasowski | F01D 5/063 415/199.4 |
| 2012/0251303 A1 | | 10/2012 | Zheng et al. | |
| 2013/0277918 A1 | * | 10/2013 | Fitzgerald | F01D 11/00 277/355 |

\* cited by examiner

BRUSH SEAL FOR A TURBINE ENGINE ROTOR

This application claims priority under 35 U.S.C. § 119 to Belgium Patent Application No. 2017/5222, filed Mar. 31, 2017, titled "Brush Seal for a Turbine Engine Rotor," which is incorporated herein by reference for all purposes.

BACKGROUND

1. Field of the Application

The present application relates to a brush seal mounted on a turbine engine rotor. The present application also relates to an axial gas turbine engine, notably an aircraft turbojet or turboprop.

2. Description of Related Art

As it operates, the rotor of a turbine engine follows significant axial and radial movements. Its axis of rotation may tip with respect to the axis of the turbine engine. In order to adapt to these movements while at the same time maintaining sealing, it is known practice to use brush seals the flexibility of which allows these movements to be accommodated. A substantial gain can be guaranteed in the context of a turbojet experiencing ingestion or loss of a fan blade.

Document U.S. 2012251303 A1 discloses a turbine engine the rotor of which collaborates in a sealed manner with the stator by virtue of a brush seal. The latter comprises bristles, or hairs, which are inclined with respect to the radial direction and with respect to the axial direction of the turbine engine. The bristles are held by a frustoconical plate and collaborate with an internal annular surface of the stator. However, the dynamic sealing recorded by the present sealing device remains limited.

Although great strides have been made in the area of seals for turbine engine rotors, many shortcomings remain.

DETAILED DESCRIPTION OF THE PREFERRED EMBODIMENT

The present application aims to solve at least one of the problems presented by the prior art. More specifically, it is an objective of the present application to improve the sealing of a turbine engine brush seal. Another objective of the present application is to simplify the assembly of a sealing device. Another objective of the present application is to propose a solution that is simple, robust, lightweight, economical, reliable, easy to produce, convenient to maintain, easy to inspect and thus improves efficiency.

One subject of the present application is a sealing device for a turbine engine, notably a turbine engine compressor, the device comprising: a stator shroud intended to be fixed to the radial ends of stator blades; a rotor with a brush seal arranged inside the shroud; noteworthy in that the shroud comprises a frustoconical internal surface the profile of which is substantially inclined with respect to the bristles of the brush seal so as to seal with the said brush seal.

According to advantageous embodiments of the present application, the device may comprise one or more of the following features, considered in isolation or in any technically feasible combinations:

The profile of the frustoconical internal surface is substantially tangential to the bristles of the brush seal.

The bristles of the brush seal extend mainly axially, possibly the bristles of the brush seal are configured in such a way as to be able to be pressed by centrifugal force firmly against the frustoconical surface.

The bristles of the brush seal comprise free parts projecting with respect to the rotor, the frustoconical surface collaborating with the said free parts.

The bristles of the brush seal extend axially over at least: 5%, or 10%, of the axial length L of the shroud.

The conicity of the frustoconical surface is comprised between; 0.1% and 10%, or between 2% and 5%.

The rotor comprises a support and at least two annular rows of rotor blades between which the brush seal is positioned, the support and the at least two annular rows of blades forming a unit assembly.

The rotor comprises a seal-fixing portion which is radially thicker than the portion of the shroud positioned facing it.

The shroud comprises a thinning in the direction of the brush seal, the said thinning possibly being thinner than the portion of the rotor arranged axially facing it.

The shroud comprises a central axial section with a circular overthickness.

The shroud is an internal shroud; preferably fixed to the internal ends of the stator blades.

The rotor comprises an annular groove open axially and in which a brush seal is fixed, notably by pinning.

The brush seal is a first seal and the frustoconical surface is a first frustoconical surface; the device further comprising a second brush seal on the rotor, and an interior second frustoconical surface which is formed in the shroud and the profile of which is substantially inclined with respect to the bristles of the second brush seal so as to seal with the said second seal.

The bristles of the first seal and of the second seal extend predominantly in the one same cone or in the one same tubular surface.

The first frustoconical surface and the second frustoconical surface have opposite conicities.

The shroud comprises a third surface axially connecting the first frustoconical surface to the second frustoconical surface, the said third surface being essentially tubular or substantially frustoconical.

The device comprises an external casing around the shroud, the said casing being formed of half-shells, or of several closed-up rings fixed together axially.

The bristles of the first seal are oriented towards the bristles of the second seal and vice versa.

At least one or each frustoconical surface extends over at least: 10%; or 20%; or 30%; 50% of the axial length of the shroud.

At least one or each brush seal has a thickness which is greater than or equal to: 10%; or 20%; or 30%; 50% of the mean radial thickness of the shroud.

The two brush seals are identical.

The maximum diameter of the frustoconical surface is greater than the maximum diameter of the brush seal or than the diameter measured at the free ends of the bristles.

Upstream and/or downstream, the or each or at least one frustoconical surface has a radius that increases towards its corresponding brush seal.

The profile of the second frustoconical surface is substantially tangential to the bristles of the second seal so as to seal.

The rotor blades are rigidly connected to the support.

The features introduced for just one brush seal apply to two brush seals when the device comprises several seals.

The profiles includes different slopes with respect to a rotation axis of the rotor.

Another subject of the present application is a turbine engine sealing device, the device comprising a rotor with a brush seal the bristles of which extend mainly axially; an internal shroud with a frustoconical internal surface which collaborates in a sealed manner with the brush seal bristles.

Another subject of the present application is a turbine engine sealing device, the device comprising a rotor with an axis of rotation, an upstream brush seal and a downstream brush seal which comprise bristles extending towards one another or towards the adjacent seal; an internal shroud with at least one internal annular surface inclined with respect to the axis of rotation of the rotor and which collaborates with the brush seals in order to seal with the rotor.

Another subject of the present application is a turbine engine, notably a turbojet, comprising at least one sealing device, characterized in that the or several or each sealing device is in accordance with the present application.

Another subject of the present application is a method of assembling a turbine engine sealing device, the method comprising the following steps: (a) supply or production of a stator shroud; (b) supply or production of a rotor with a brush seal with bristles; (c) introduction of the rotor into the shroud; notable in that the shroud comprises a frustoconical internal surface able to collaborate in a sealed manner with the brush seal; and in that, during step (c) introduction the frustoconical surface pushes the bristles of the brush seal in the event of misalignment between the rotor and the shroud, the sealing device possibly being in accordance with the present application.

According to one advantageous embodiment of the present application, during step (c) introduction, the frustoconical surface pushes the bristles radially inwards.

In general, the advantageous embodiments of each subject of the present application are also applicable to the other subjects of the present application. Each subject of the present application can be combined with the other subjects and the subjects of the present application can also be combined with the embodiments of the description which, furthermore, can be combined with one another, in any technical feasible combinations.

The present application makes it possible to improve sealing. Specifically, each frustoconical surface offers a section that is inclined with respect to the sealed bristles, thereby increasing the thickness of shroud that can intercept these bristles in order to provide sealing. The seal is better at adapting to the movements between the rotor and the stator, and to vibrations. Also, the design of the platforms optimizes the integration of the brush seals, the lightness of weight and the rigidity of the rotor.

The present application also makes it possible to make the device easier to fit because the shroud helps the seals to settle into position. The bristles slide against their frustoconical surfaces in the event of rotor/stator axial misalignment. The risk of the bristles becoming trapped and possibly broken is reduced. This preserves the integrity of the seal, improves its durability and therefore the reliability of operation.

In the description which will follow, the terms "internal" and "external" refer to a positioning with respect to the axis of rotation of an axial turbine engine. The axial direction corresponds to the direction along the axis of rotation of the turbine engine. The radial direction is perpendicular to the axis of rotation. Upstream and downstream are with reference to the main direction of flowing of the flow through the turbine engine. Conicity is defined as being a variation in diameter divided by the length over which the said variation in diameter is measured. Frustoconical is understood as a truncated cone along its length. The peak thereof may be cut.

Figure 1:
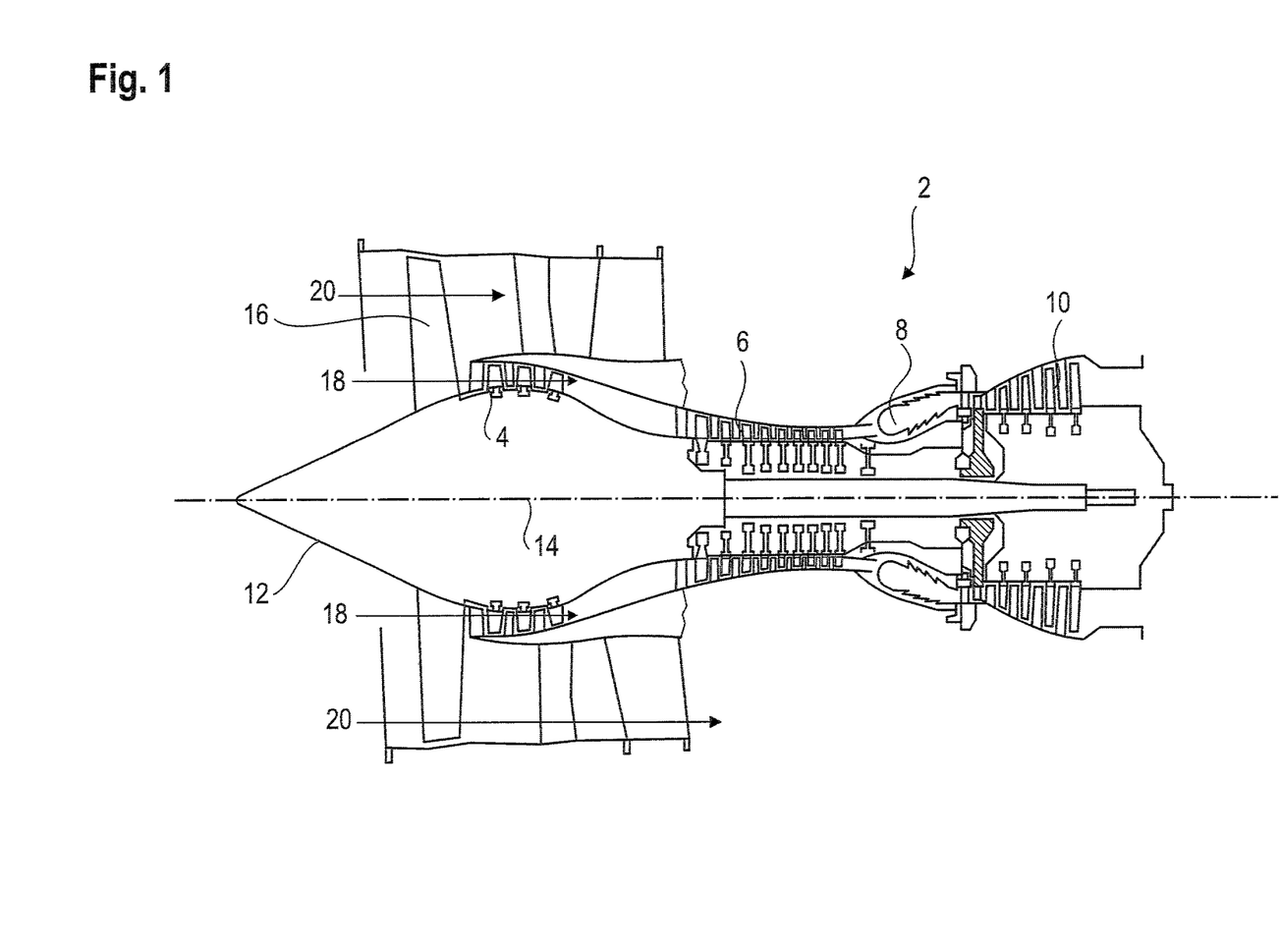
FIG. 1 depicts an axial turbine engine according to the present application.

FIG. 1 is a simplified depiction of an axial gas turbine engine. In this particular instance this is a bypass turbojet. The turbojet 2 comprises a first compression stage referred to as the low-pressure compressor 4, a second compression stage referred to as the high-pressure compressor 6, a combustion chamber 8 and one or more turbine stages 10. During operation, the mechanical power of the turbine 10 transmitted via the central shaft to the rotor 12 drives the movement of the two compressors 4 and 6. These comprise several rows of rotor blades associated with rows of stator vanes. Rotation of the rotor about its axis of rotation 14 thus makes it possible to generate an air flow and to compress it progressively until it enters the combustion chamber 8.

An inlet blower more commonly referred to as a fan 16 is coupled to the rotor 12 and generates an airflow which is split into a primary flow 18 that passes through the various abovementioned stages of the turbine engine, and a secondary (bypass) flow 20 that passes along a (partially depicted) annular duct along the machine to meet back up again with the primary flow at the exit from the turbine. The secondary flow may be accelerated so as to generate a reaction jet thrust of use to the flight of an aircraft.

Figure 2:
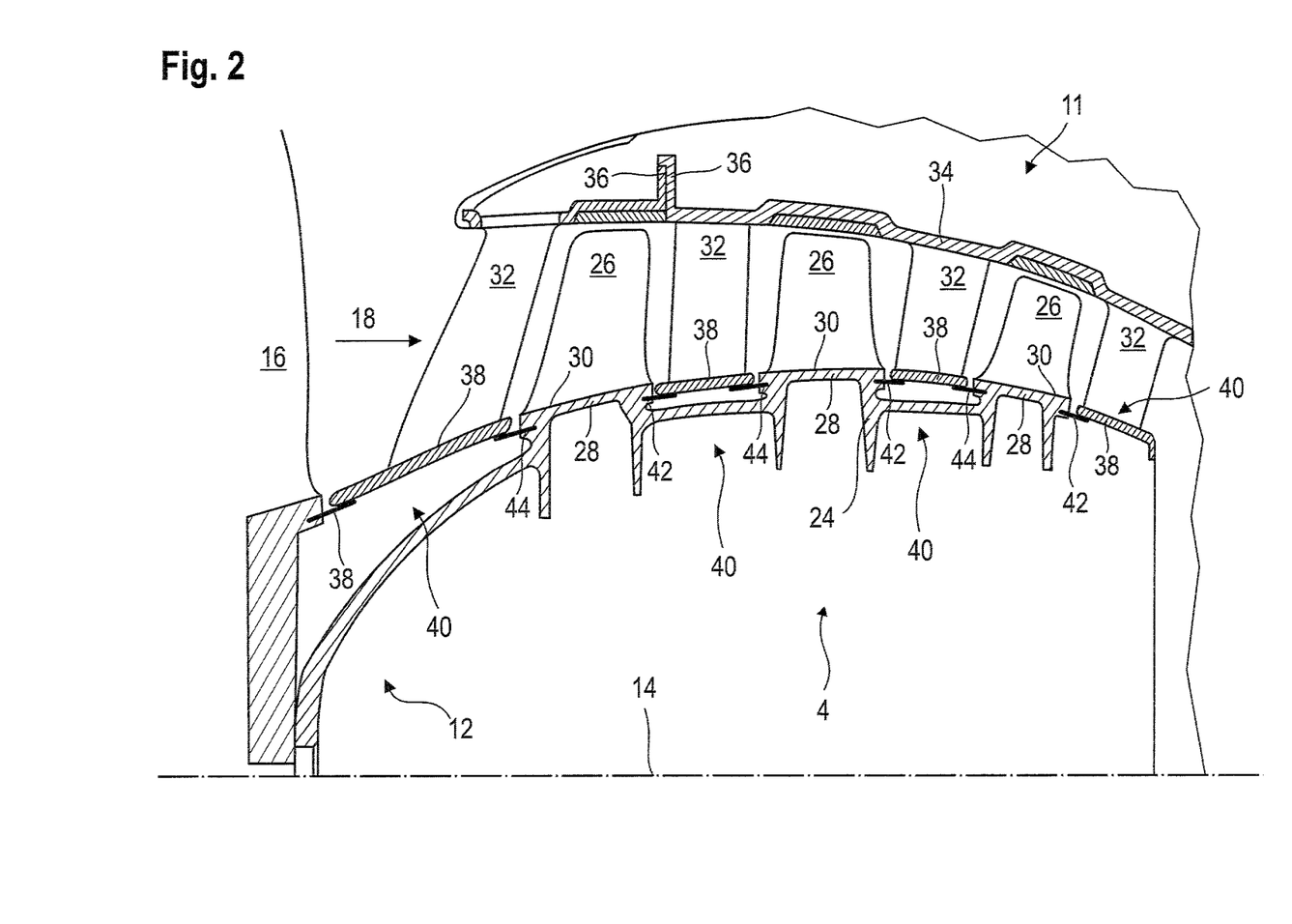
FIG. 2 is a diagram of the low-pressure compressor of FIG. 1.

FIG. 2 is a view in cross section of a compressor of an axial turbine engine like that of FIG. 1. The compressor may be the low-pressure compressor 4.

The rotor 12 may comprise an essentially hollow drum 24. It may be made from a metal such as titanium. Alternatively, the rotor 12 is formed of discs. The rotor 12 comprises at least one, preferably several, rows of rotor blades 26, in this instance three. The blades 26 are borne by the drum 24 or the discs. The rotor 12 may comprise at least one, preferably several, annular platforms 28 each of which is associated with a row of rotor blades 26. The annular platforms 28 may be fixing supports from which the rotor blades 26 extend radially. The annular platforms 28 comprise exterior surfaces 30 that guide the primary annular flow 18. The rotor blades 26 may be welded to the drum 24 in such a way as to form a unit assembly. Alternatively, the rotor blades may be machined from a blank including the annular platforms, or be fixed by dovetails introduced into annular grooves formed in the rotor.

The stator 11 of the compressor 4 comprises at least one stator vane assembly, preferably several stator vane assemblies, in this instance four, which each contain a row of stator vanes 32. The stator vane assemblies, or stator rectifiers, are associated with the fan 16 or with a row of rotor blades 26 to straighten the flow of air, so as to convert the speed of the flow into pressure.

The stator vanes 32 extend essentially radially from an outer casing 34 of the stator 11. The stator vanes 32 may be welded to the exterior casing 34, or fixed thereto using pins. The outer casing 34 may be formed of two half-shells fixed together with axial flanges. The casing 34 may be formed of axial segments in the form of closed-up rings. These closed-up rings are fixed together axially, for example via their radial annular flanges 36.

The stator 11 comprises at least one shroud 38 associated with an annular row of stator vanes 32, preferably several shrouds 38, each one associated with an annular row of stator vanes 32. The shrouds 38 may be internal shrouds. They generally have a shape exhibiting symmetry of revolution with a profile of revolution about the axis 14. The shrouds 38 like the external casing 34 may be made from one or more composite materials involving an organic matrix in which a fibre reinforcement is embedded. They may also be made of metal, for example with a titanium or aluminium alloy.

The rotor 12 comprises at least one, preferably several, sealing devices 40 collaborating with the stator 11. Each sealing device 40 opposes the circulation of leakage flows between the drum 24 and the shrouds 38; notably at the axial clearance between the annular platforms 28 and the shrouds 38.

At least one or each sealing device 40 comprises a brush seal, or possibly two brush seals, these being a first brush seal 42 and a second brush seal 44. These may correspond to an upstream brush seal 42 and to a downstream brush seal 44 respectively. Each brush seal is circular. These brush seals (42; 44) are attached to the rotor 12. They are implanted on the drum 24 or on the discs. They may be integrated into the radial thickness of the annular platforms 28. An upstream brush seal 42 may be integrated into the disc of the fan 16.

Figure 3:
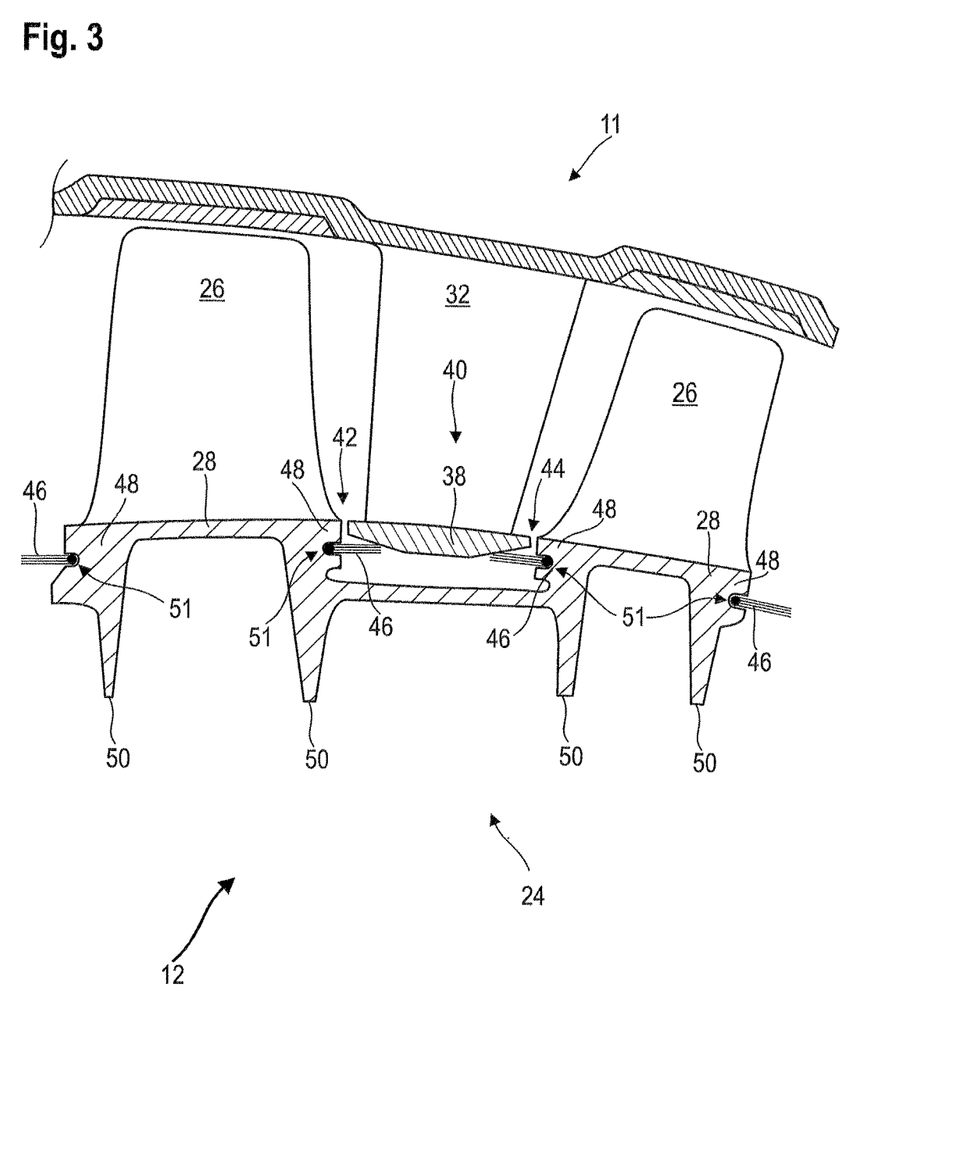
FIG. 3 illustrates the sealing device of the compressor of FIG. 2.

FIG. 3 roughly shows a portion of compressor showing a sealing device 40, for example one of those illustrated in FIG. 2.

The sealing device 40 is arranged between two rows of rotor blades 26 and is associated with an annular row of stator vanes 32. It is notable that the brush seals (42; 44) collaborate in a sealed manner with the internal annular face of the shroud 38.

At least one, and preferably each, brush seal (42; 44) comprises a part fixed in the annular platform 28, and a free part. Each free part projects, mainly axially, with respect to the annular platform 28 and is enveloped by the shroud 38. During turbine engine operation, centrifugal force pushes the free parts of the bristles 46 outwards; namely against the shroud 38. The bristles 46 may be made of an organic material, for example a polymer, and have a diameter smaller than 2.0 mm, preferably small than 0.20 mm.

The rotor 12 and/or the stator 11, notably their blades or vanes (26; 32), may be configured in such a way that the operating point at ambient temperature or in cruising flight lies at a rotational speed greater than or equal to: 1000 revolutions/minute, or 4000 revolutions/minute, or 8000 revolutions/minute, or 15 000 revolutions/minute. At these speeds, each seal touches its shroud in order to provide sealing. At rest, or below the operating point, the bristles may lie some distance from the associated shroud, so as to maintain a margin for movement.

Each brush seal (42; 44) is integrated into one of the annular platforms 28 of the rotor 12, for example at the upstream end and at the downstream end. The brush seals (42, 44) may be arranged in fixing portions 48 which may be circular thickenings 48 of the annular platforms 28. These fixing portions 48 may form circular beads. They may be in the radial continuation of internal stiffeners 50 of the rotor 12, notably of the drum 24.

In addition, the annular platforms 28 may have regions of lesser thickness between the brush seals (42; 44) and/or between the circular thickenings 48.

At least one or each annular platform 28 may comprise an annular groove 51 open axially towards the shroud 38, or two annular grooves 51 oriented towards two shrouds (just one being depicted). Each seal may comprise a rigid ring arranged in the corresponding groove 51, a fixing pin may be associated with each seal to immobilize it in the corresponding groove 51.

Figure 4:
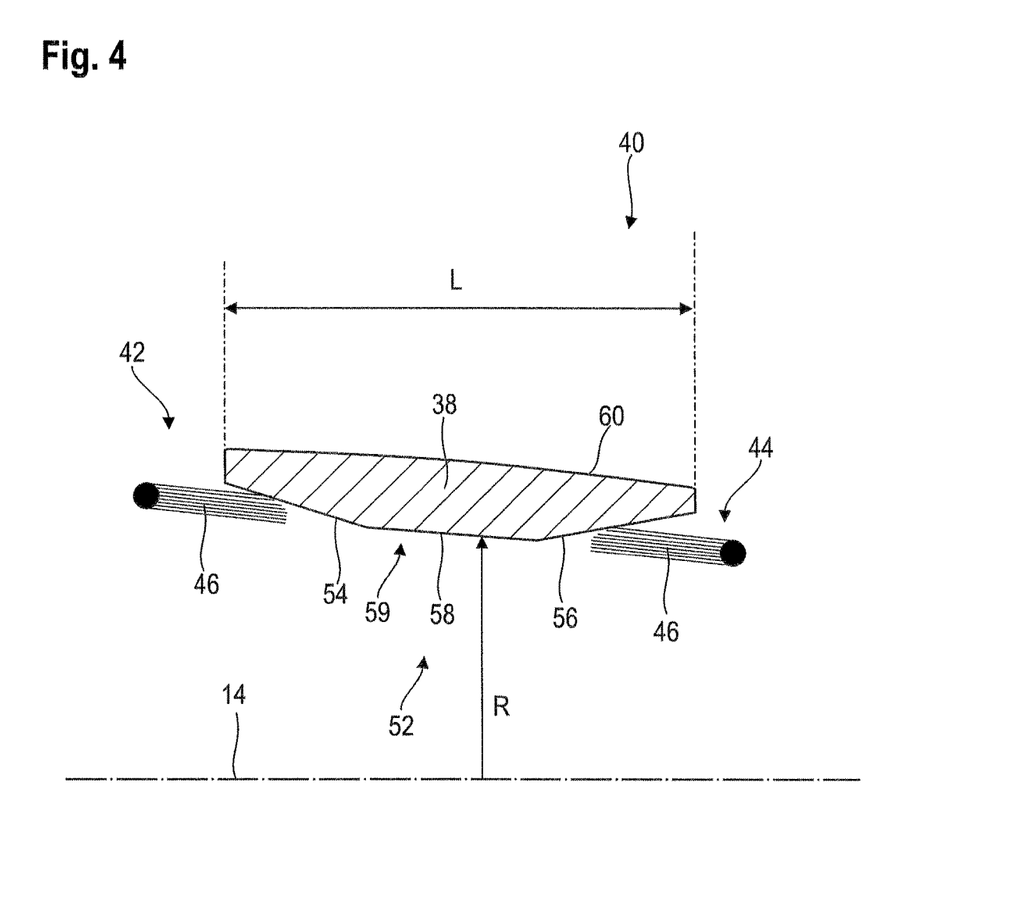
FIG. 4 is an enlargement of the shroud and of the brush seals of FIG. 3.

FIG. 4 depicts a sealing device according to the present application. The device 40 may correspond to those described in connection with FIGS. 2 to 3.

The shroud 38 may have a variable thickness and/or a variable internal radius R; the said radius being measured from the axis of rotation 14. The internal radius R is measured against the internal annular face 52 of the shroud 38. This internal face 52 may comprise several sections exhibiting different axial variations in radius R. The internal face 52 may comprise at least one frustoconical surface or at least two frustoconical surfaces, including a first frustoconical surface 54 and a second frustoconical surface 56. Frustoconical may be understood as meaning a surface that is generally conical and/or based on a cone. The surfaces 54; 56 may correspond to an upstream frustoconical surface 54 and to a downstream frustoconical surface 56 respectively. These surfaces are internal surfaces. Their conicities may be comprised between: 1% and 30% or 5% and 25%, or between 10% and 15%, for example. Each frustoconical surface has a profile of revolution about the axis of rotation 14, for example a straight line, which is inclined with respect to the axis 14. When the shroud is in the upstream half of the compressor, the upstream conicity is greater than the downstream conicity. The opposite may be seen in the downstream half of the compressor.

These surfaces (54; 56) may lie some distance from one another, notably axially. In this regard, they be separated by a third surface 58 which may form a junction. The third surface 58 may be essentially tubular, or possibly substantially frustoconical. Its conicity is less than that of the upstream surface 54 and of the downstream surface 56. It may be formed by a central section 59 which forms the maximum thickness of the shroud 38.

The shroud 38 thins axially because of the frustoconical surfaces 54 and 56. The thickness of the shroud 38 may decrease towards its axial ends, notably because of the presence of the frustoconical surfaces (54; 56) which imply a reduction in material since the external surface 60 exhibits a continuous slope. The external surface 60 may be tubular or frustoconical. Each of the surfaces 54; 56, 58 and 60 may be substantially spheroidal, therefore having dual curvature, rather than exclusively tubular or frustoconical. In the present example, the first and second frustoconical surfaces have opposite conicities because their internal radii R increase in opposite directions, notably towards the outside of the shroud, namely towards the seals, 42; 44.

The bristles 46 extend towards one another. The upstream seal 42 may comprise bristles 46 parallel to and/or collinear with bristles 46 of the downstream seal 44. They protrude into the shroud 38 for example over at least 2% of its length L. They may extend axially over at least 5% of the associated frustoconical surface.

Figure 5:
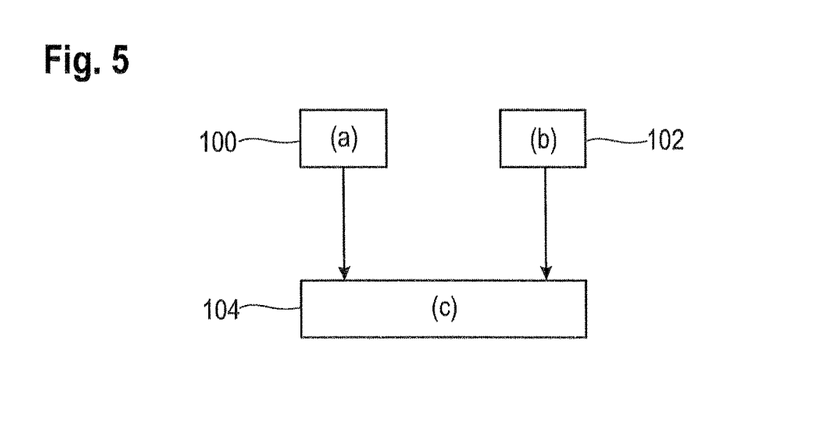
FIG. 5 is a diagram of a method of assembling a sealing device according to the present application.

FIG. 5 is a diagram of the method of assembling a sealing device according to the present application. The device, may correspond to those described in connection with FIGS. 2 to 4.

The method may comprise the following steps:
supply or production 100 of a stator shroud;
supply or production 102 of a rotor with a brass seal with bristles;
introduction 104 or insertion of the rotor into the shroud, lodging each of the seals in its shroud frustoconical sealing surface.

Steps (a) and (b) supply or production 100 and 102 may be performed simultaneously.

During step (c) introduction 104, the bristles are pushed by their frustoconical surface in the event of misalignment, for example in the event of an offset or inclination between the axis of symmetry of the shroud and the axis of rotation of the rotor.

During step (c) introduction 104, the frustoconical surface pushes the bristles of the brush seal, or the first and second frustoconical surface push the brush seals, for example radially inwards. The bristles are angled over towards the axis of rotation. The movement of the seal bristles may be progressive. In particular, the introduction of bristles is guided by the frustoconical surfaces which avoid butting against the ends of the shroud. These surfaces limit the risk of the bristles becoming bent or trapped during fitting.

In the event of alignment, introduction may be contactless. Each frustoconical surface remains radially distant from its seal.

We claim:

1. A sealing device for a turbine engine, the sealing device comprising:
   a stator shroud intended to be fixed to radial ends of stator vanes; and
   a rotor with a brush seal arranged inside the stator shroud;
   wherein the stator shroud comprises:
      a frustoconical internal surface with a profile which is substantially inclined with respect to bristles of the brush seal so as to seal with the said brush seal.

2. The sealing device according to claim 1, wherein the profile of the frustoconical internal surface is substantially tangential to the bristles of the brush seal.

3. The sealing device according to claim 1, wherein the bristles of the brush seal extend mainly axially, the bristles of the brush seal are structurally and functionally configured to be pressed by centrifugal force firmly against the frustoconical internal surface.

4. The sealing device according to claim 1, wherein the bristles of the brush seal comprise:
   free parts projecting with respect to the rotor, the frustoconical internal surface physically engaging with said free parts.

5. The sealing device according to claim 1, wherein the bristles of the brush seal extend axially over at least 5% or 10% of an axial length L of the stator shroud.

6. The sealing device according to claim 1, wherein a conicity of the frustoconical internal surface is comprised between: 0.1% and 10%, or between 2% and 5%.

7. The sealing device according to claim 1, wherein the rotor comprises:
   a support; and
   at least two annular rows of rotor blades between which the brush seal is arranged, the support and the at least two annular rows of rotor blades forming an integral assembly.

8. The sealing device according to claim 1, wherein the rotor comprises:
   a seal-fixing portion which is radially thicker than the portion of the stator shroud positioned axially in front of said seal-fixing portion.

9. The sealing device according to claim 1, wherein the stator shroud comprises:
   a thinning axially toward the brush seal, the said thinning being thinner than the portion of the rotor disposed axially in front of it.

10. The sealing device according to claim 1, wherein the stator shroud comprises:
    a central axial section with a circular radial overthickness.

11. The sealing device according to claim 1, wherein the stator shroud is an internal shroud fixed to radial inner ends of the stator vanes.

12. The sealing device according to claim 1, wherein the rotor comprises:
    an annular groove open axially and in which the brush seal is fixed.

13. The sealing device according to claim 1, wherein the brush seal is a first brush seal and the frustoconical internal surface is a first frustoconical surface, the sealing device further comprising:
    a second brush seal on the rotor; and
    a second frustoconical surface which is formed in the stator shroud and a profile of which is substantially inclined with respect to bristles of the second brush seal so as to seal with the said second brush seal.

14. A sealing device for a turbine engine, the sealing device comprising:
    a stator shroud intended to be fixed to the radial ends of stator vanes; and
    a rotor with a first brush seal and a second brush seal which are arranged inside the stator shroud;
    the stator shroud comprises:
       a first frustoconical surface and a second frustoconical surface which engage the first brush seal and the second brush seal, the latter including bristles which are inclined with respect to profiles of the first frustoconical surface and of the second frustoconical surface.

15. The sealing device according to claim 14, wherein the bristles of the first brush seal and of the second brush seal each include a set of bristles which extends predominantly in a same cone or in a same tubular surface.

16. The sealing device according to claim 14, wherein the first frustoconical surface and the second frustoconical surface exhibit opposite conicities, and the bristles of the first frustoconical surface and of the second frustoconical surface are biased with respect to the profiles with opposite angles.

17. The sealing device according to claim 14, wherein the stator shroud comprises:
    a third surface axially connecting the first frustoconical surface to the second frustoconical surface, the said third surface being essentially tubular or substantially frustoconical.

18. The sealing device according to claim 14, wherein the sealing device comprises:
    an external casing around the stator shroud, the said casing being formed of half-shells, or of several closed-up rings fixed together axially.

19. A method of assembling a turbine engine sealing device, the method comprising:
    supply or production of a stator shroud;
    supply or production of a rotor with a brush seal with inclined bristles;
    introduction of the rotor into the stator shroud;
    wherein the stator shroud comprises:
       a frustoconical internal surface with a profile able to cooperate in a sealed manner with the brush seal;

and in that, during step introduction, the frustoconical internal surface pushes the inclined bristles of the brush seal in the event of misalignment between the rotor and the stator shroud.

20. The assembly method according to claim 19, wherein during step introduction, the frustoconical internal surface pushes the inclined bristles radially inwards.

\* \* \* \* \*